(12) United States Patent
McFarlane et al.

(10) Patent No.: US 6,397,965 B1
(45) Date of Patent: Jun. 4, 2002

(54) ENGINE CONFIGURATION FOR MASS TRANSIT VEHICLE

(75) Inventors: Blaine J. McFarlane; Derrin L. Olischefski; Glenn M. Campbell, all of Winnipeg; Ron M. Crampton, Oakbank; Louis P. Hildebrand, Landmark, all of (CA)

(73) Assignee: New Flyer Industries Limited, Winnipeg (CA)

( * ) Notice: Subject to any disclaimer, the term of this patent is extended or adjusted under 35 U.S.C. 154(b) by 0 days.

(21) Appl. No.: 09/652,672

(22) Filed: Aug. 31, 2000

(51) Int. Cl.$^7$ .............................. B60K 6/00; B60S 5/00; B66F 5/02

(52) U.S. Cl. ..................... 180/298; 180/65.4; 180/68.5; 180/312; 269/17; 280/79.11

(58) Field of Search ................................ 180/312, 298, 180/294, 299, 65.4, 65.8, 65.1, 68.5; 280/79.11; 269/17

(56) References Cited

U.S. PATENT DOCUMENTS

| | | | | |
|---|---|---|---|---|
| 2,035,212 A | * | 3/1936 | Alborn | 180/298 |
| 4,177,978 A | * | 12/1979 | Warsaw | 269/17 |
| 4,231,708 A | * | 11/1980 | Telesio | 180/298 |
| 4,325,451 A | * | 4/1982 | Umeda | 180/312 |
| 4,846,451 A | * | 7/1989 | Squier | 269/17 |
| 4,899,843 A | * | 2/1990 | Takano et al. | 180/312 |
| 5,599,031 A | * | 2/1997 | Hodges | 280/79.11 |

OTHER PUBLICATIONS

"Hybri Drive™ Propulsion System by Lockheed Martin", Lockheed Martin Brochure, 2 pages, Undated.

"EVBulletin", Electric Vehicle Product Update from ISE Research, vol. II, Issue I, Apr. 1999, 2 pages, ISE Research Corporation, San Diego, California.

* cited by examiner

Primary Examiner—Peter C. English
(74) Attorney, Agent, or Firm—Adrian D. Battison; Michael R. Williams

(57) ABSTRACT

A public transit vehicle is driven by a hybrid drive system including a diesel engine, a generator driven by the engine, two battery packs for storing energy from the generator and from re-generated braking energy and a transmission in the form of a motor driven by the electrical energy from the generator and/or the batteries. The drive components are mounted on a sub-frame for carrying which is arranged for readily releasable attachment to the main longitudinal beams of the vehicle body so as to be carried on the vehicle body during operation of the vehicle. The sub-frame itself is designed simply and avoiding duplication of support elements so that it is incapable of supporting by itself the radiator and the transmission which are partially supported in use by elements of the vehicle body. There is provided a movable service dolly for supporting the sub-frame with the engine components thereon and for supporting the radiator and the transmission so that the dolly and the sub-frame co-operate to support all of the engine components during servicing so that they can be removed together. The engine is arranged transverse to the longitudinal frame with the radiator to one side of the body and the generator directly driven at the rear end of the engine and the motor/transmission in front of the engine. The battery packs are arranged on the roof each on a respective side and one aligned side by side with the electrical controllers for the engine system.

15 Claims, 7 Drawing Sheets

ENGINE CONFIGURATION FOR MASS TRANSIT VEHICLE

This invention relates to a vehicle, such as a mass transit bus, and particularly to an engine configuration for the vehicle including the location, arrangement and support of various components of the engine for convenience of operation and maintenance.

BACKGROUND OF THE INVENTION

The present invention is particularly but not exclusively directed to a system which uses drive communication components which are generally known as a "series hybrid" in which an internal combustion engine is associated with an electric generator such that operation of the engine is used to generate electric power rather than to provide direct power transmission to the vehicle. The electrical power is transmitted to an electric motor separate from the engine and connected to the ground wheels of the bus for driving the ground wheels and thus propelling the bus. Battery packs are provided for storing energy from the generator and from re-generated braking energy.

Another type of hybrid drive is the parallel hybrid in which the engine has a direct mechanical connection through a transmission to the drive wheels but is assisted by a motor/generator in parallel to the engine.

However the present invention is not wholly concerned with the series hybrid drive system but can also be used in conjunction with conventional drive systems having an internal combustion engine in which the drive communication component comprises a power transmission which communicates power from the engine through a mechanical or hydraulic linkage to the vehicle wheels.

Hybrid power vehicles have been proposed for many years but have recently received added attention in view of significant energy savings and reduction in emissions.

One example of a series hybrid system of this type proposed by Lockheed Martin and entitled HybriDrive™ propulsion system is described in a brochure published by that company.

Another example is described in a paper issued by ISE Research Corporation of San Diego Calif. which describes initial trials using a drive system of this type.

In addition the components for the system including an engine control system, an electric generator for driving by the internal combustion engine, an electric drive motor and electric control systems has been developed by Allison Electric Drives which is a division of General Motors. These components therefore are available commercially but the arrangement, mounting and location of the elements in the vehicle is the responsibility and function of the vehicle manufacturer, bearing in mind the framing arrangements, structural elements and final drive components of the vehicle that they intend to manufacture.

One aspect of the present invention is therefore concerned with the layout, mounting and support of the various engine components for a vehicle and primarily for a transit bus.

The engine components either of the conventional construction or of the hybrid construction are conventionally mounted in the rear engine compartment of the bus so that they are accessible under rear cover for service. Conventionally the engine components are mounted on frame elements forming rigid components of the structure of the vehicle so that the installation of the engine components is carried out by installing one at a time within the engine compartment thus building up the complete engine structure on the vehicle itself.

Generally the frame of the vehicle includes two longitudinal frame beams spaced either side of the centre line of the vehicle and at the rear the beams include a coupling section inclined downwardly and rearwardly so that the portions of the beams on which the engine component sit are at a height downwardly from the frame beams forwardly of that point which pass over the rear axle. Various transverse members and tabs are provided on the beams so as to provide support for the various components of the engine as they are installed.

This method of installation in which the engine components are installed separately within the engine compartment has become widely adopted in the industry.

An alternative arrangement for mounting the engine components is to provide an entirely separate subframe assembly which can be installed into the engine compartment with the components already attached to the frame and carried thereby. This arrangement of course has the advantage that the engine components can be assembled separately from the vehicle in an area which can allow increased accessibility therefore allowing easier and faster work by the installers.

However this arrangement has the disadvantage that the frame itself carrying the engine components must be a self supporting frame with sufficient strength and rigidity to carry the components while they are transferred from the installation location into the engine compartment. This arrangement therefore increases the framing components required and provides excess strength and duplication of strengthening elements thus significantly increasing the weight and complexity of the total frame structure. This technique has therefore been generally abandoned in recent manufacturing systems, bearing in mind the high priority in current manufacturing techniques for minimizing cost and complexity by eliminating duplication.

SUMMARY OF THE INVENTION

It is one object of the present invention, therefore, to provide an improved layout and mounting of engine components for a vehicle to improve ergonomics and operation efficiency.

According to a first aspect of the invention there is provided a combination comprising:

a vehicle having:

a vehicle body including structural members therein;

a plurality of ground wheels mounted on the vehicle body for carrying the vehicle body in movement across the ground;

an engine system including a plurality of engine components for driving at least two of the ground wheels for propulsion of the vehicle;

a sub-frame for carrying at least some of the engine components;

the sub-frame being arranged for readily releasable attachment to the vehicle body so as to be carried on the vehicle body during operation of the vehicle and being removable from the vehicle with the engine components thereon for servicing of the engine components;

the sub-frame itself being incapable of supporting by itself at least one of the engine components;

and a movable service dolly for supporting during servicing the subframe with the engine components thereon, the dolly including:

first support elements for supporting the sub-frame;
and second support elements for supporting said at least one component such that the dolly and the sub-frame co-operate to support all of the engine components during servicing.

Preferably the engine component which is carried on the dolly during servicing and is attached to the body in use is attached to both the sub-frame and the vehicle body so as to receive support from both the sub-frame and the vehicle body in use. This ensures the proper location of the elements both during assembly and service on the dolly and when carried into installation in the vehicle body.

Preferably the second support elements on the dolly for supporting the component include adjustable jacks for adjusting the height of the component relative to the dolly. This allows the height to be adjusted as the sub-frame is brought into registration with the body to ensure that the connection to the body can be properly made before the dolly is withdrawn.

Preferably the dolly includes ground wheels by which the dolly can be rolled and wherein the vehicle body is arranged such that the dolly and the subframe with the engine components thereon can be rolled into one end of the body.

Preferably engine components include an engine, a radiator for cooling the engine, a transmission and connections therebetween such that the components are sufficiently complete to operate on the sub-frame and dolly during servicing.

Preferably the radiator is mounted on one side of the sub-frame for location in an opening at one side of the vehicle body and wherein the radiator is attached to the vehicle body at the opening. This ensures proper co-operation between the radiator and the body at the opening to prevent rattle and to hold the radiator properly aligned with the opening.

Preferably the sub-frame is arranged for insertion into the vehicle body from one end and wherein the transmission is mounted on a remote end of the subframe for insertion into the vehicle body beyond the engine and wherein a remote end of the transmission is mounted on the vehicle body.

Preferably the vehicle body includes two parallel longitudinal beams on which the sub-frame is carried and wherein each beam includes an inwardly projecting tab member onto which a mounting of the remote end of the transmission is located. This allows the dolly to be located between the main beams and moved into place without the dolly contacting or interfering with the main beams as the components are transferred from the dolly to the main frame.

Preferably the engine components and the sub-frame are located at a rear end of the vehicle and the transmission is arranged to drive a differential of a rear axle of the vehicle. This is a convenient and common arrangement suitable for transit vehicles but the same concepts can be used for a front mounted engine or in other types of vehicle.

Preferably the dolly is arranged such that the engine components when supported on the dolly are at a height greater than when supported on the vehicle body. This allows the engine components to be at a height convenient for servicing and to allow them to be wheeled into the engine bay of the vehicle with the vehicle raised or jacked to a convenient height to allow an operator to enter the bay to make the necessary connections Preferably the sub-frame is arranged for mounting on the vehicle body at one end of the vehicle body and wherein the sub-frame includes bumper plates at an outer end for carrying a bumper of the vehicle.

The above dolly and sub-frame arrangement can be used either with conventional engine and transmission arrangements, where the transmission is mechanical and/or hydraulic or with other arrangements such as so-called hybrid drive systems where in a series hybrid system the conventional mechanical transmission is replaced by an electrical generator driven by the engine and a motor driven by electrical power from the generator and in a parallel hybrid system the conventional mechanical transmission is replaced by a transmission system which allows supply of power from or to an electric motor/generator.

BRIEF DESCRIPTION OF THE DRAWINGS

One embodiment of the invention will now be described in conjunction with the accompanying drawings in which.

DETAILED DESCRIPTION

Figure 1:
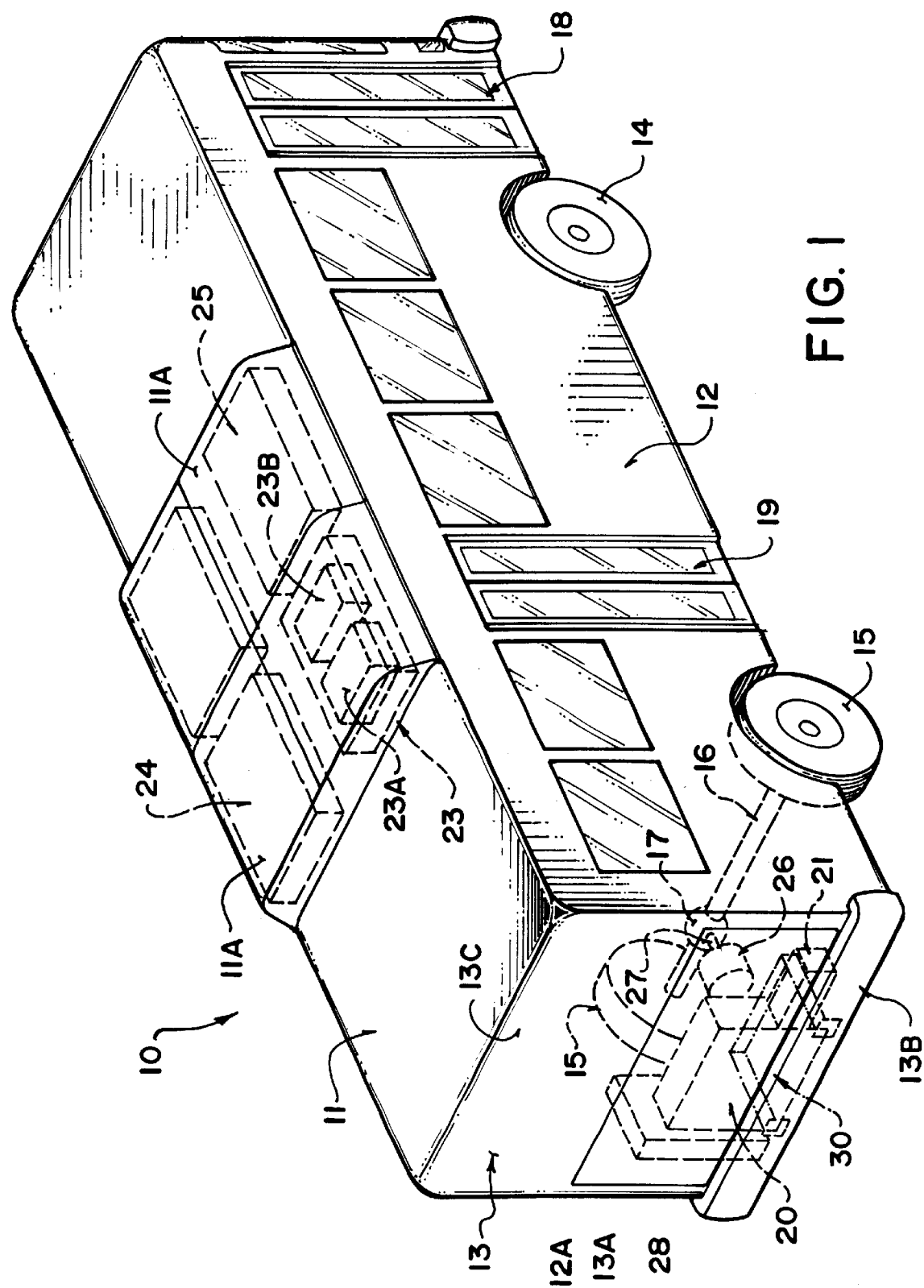
FIG. 1 is an isometric view of a transit bus including a hybrid drive arrangement including a number of separate engine components and support cradle for the components according to the present invention.

A transit bus is shown in FIG. 1 which includes a vehicle body 10 having a roof 11, two side walls 12, 12A, a rear wall 13, and a supporting frame and floor arrangement thus forming a body into a structural arrangement which can accommodate the necessary loading from the passengers through the ground wheels to the ground. The ground wheels include front wheels 14 mounted on the front axle and rear ground wheels 15 mounted on a rear drive axle 16 including a drive differential 17.

The structure and arrangement of the bus can of course vary and various structures can be selected in accordance with requirements using the knowledge of one skilled in the art.

Generally transit buses of this type have a central aisle with passenger seats on each side of the aisle leading to a front door 18 and a rear door 19 allowing the passengers to enter and leave the vehicle.

Buses of this type can be driven by a conventional engine component including an internal combustion engine and a drive communication component in the form of a mechanical transmission connected to the output end of the engine and driven thereby with the mechanical transmission being connected to the input drive shaft of the differential 17 for driving the rear wheels 15. Generally the engine is mounted in the rear longitudinally of the vehicle with the transmission behind the engine that is between the engine and differential 17.

In the embodiment shown the engine components are of the hybrid type including an internal combustion engine 20 which drives a drive communication component 201 in the form of an electric generator 21 connected at one end of the engine with the engine being arranged in transverse arrangement across the vehicle. The electric generator generates electric power which is supplied through an electrical control system generally indicated at 23 for storage of some part of electrical power within battery components 24 and 25. Electrical power from the generator is also transmitted to an electric motor 26 which has an output shaft 27 driving the input to the differential 17. The engine is mounted transversely so that its end with the accessory drive pulleys is arranged near the side wall 12A of the vehicle adjacent a radiator 28 positioned in the side wall 12A.

The radiator includes stacked radiator components one above the other for cooling the engine, for cooling engine charge air in a turbocharger intercooler system and for cooling the electrical motor with the components arranged to be sized to accommodate the cooling requirements involved for each element. The flow is preferably bi-directional that is across the radiator and back in upper and lower channels of the radiator component. The dividing baffles and the specific hose connections are not shown since these will be well apparent to one skilled in the art.

Figure 2:
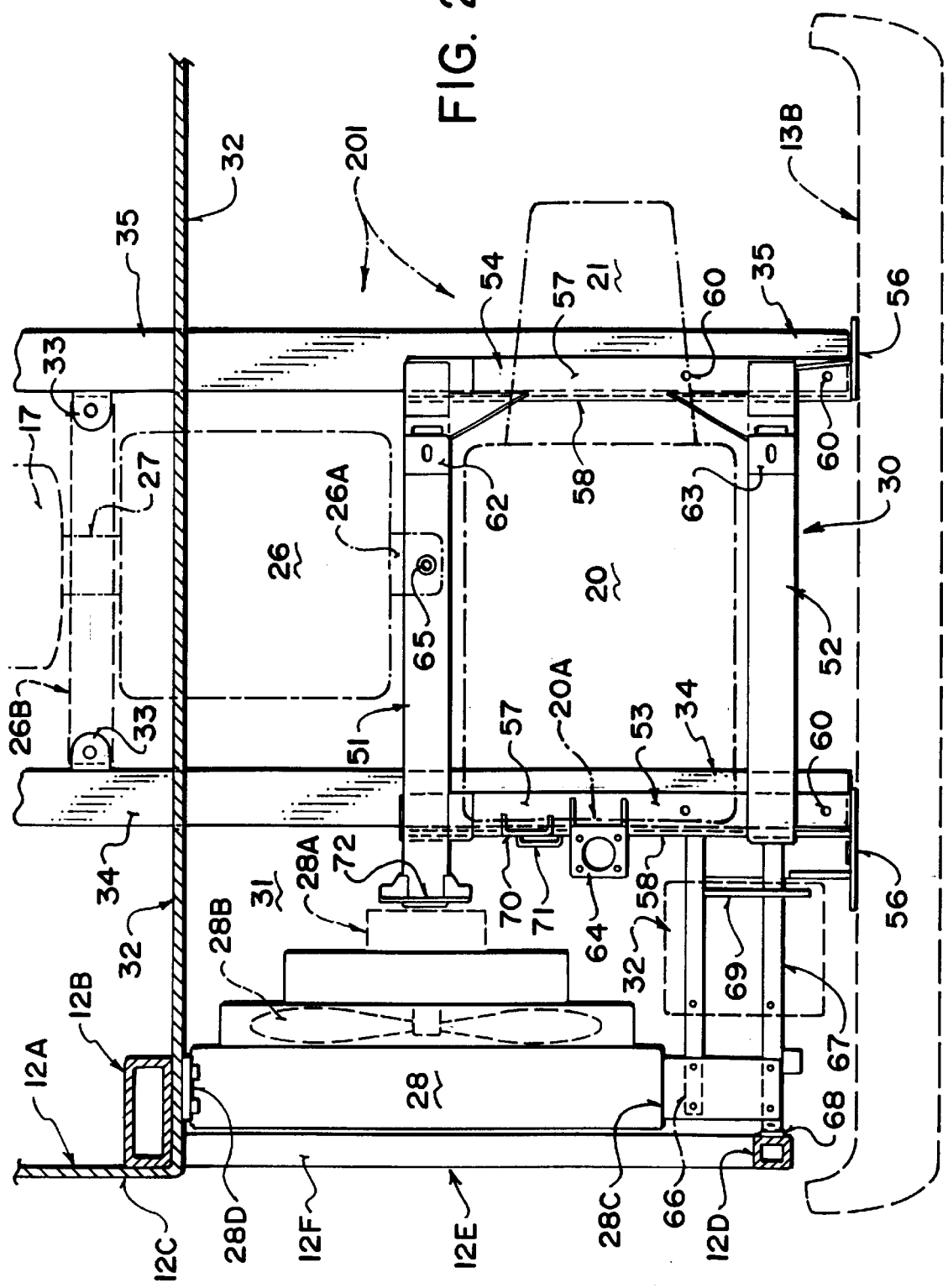
FIG. 2 is a top plan view partly in phantom showing the engine and cradle arrangement of FIG. 1 mounted in the bus of FIG. 1.

The engine components including the engine 20, the generator 21, the radiator 28 and the motor 26 are all carried partly on a sub-frame component or cradle 30 as thus shown in FIG. 2. The engine components are mounted in an engine compartment 31 rearwardly of a firewall 32 separating the engine components from the passenger section of the vehicle. The rear wall 13 of the vehicle includes a rear panel 13A which can be opened to allow access to the engine components and a fixed rear wall panel 13C above the hinged panel 13A. Below the hinge panel 13A is provided a transverse rigid bumper 13B.

The construction of the frame and the panelling of the vehicle is shown in more detail in prior U.S. application Ser. No. 09/497,633 filed Feb. 3, 2000 and entitled Side Impact Structure for Mass Transit Vehicle and application Ser. No. 09/496,684 filed on the same date and entitled Body Structure of Mass Transit Vehicle. The disclosures of the above are hereby incorporated by reference.

The side wall further include s a rear post 12D located at the rear wall. Between the adpost 12D is an opening 12E which receives a front face of the radiator 28. The opening 12E has a height only equal to the height of the radiator so that above the opening is a horizontal rail 12F to which the side wall panelling above the radiator is attached.

As thus shown in FIG. 2, the engine 20 is mounted on the cradle 30 so that a first end 20A of the engine is presented toward the side wall 12A of the vehicle. The first end 20A of the engine includes conventional pulleys for driving engine accessories in conventional manner. One such accessory comprises the radiator 28 and the radiator thus includes a clutched pulley schematically indicated 28A for driving the radiator fan schematically indicated at 28B. The engine accessories in conventional manner include an electrical generator, an air compressor and an air-conditioning compressor and one of these is indicated schematically at 32. The construction and arrangement of the remaining elements is of course well known to one skilled in the art so these are not shown in detail.

At the other or second end of the engine is directly attached the generator 21 so that this is supported by the engine itself. The details of a suitable engine for example from Cummins Engine Company and the generator as part of a series hybrid drive system for example from Allison Electric Drives are again well known to one skilled in the art as set forth above.

This mounting of the engine with the first end adjacent the radiator allows the engine accessories to be conveniently mounted at the end of the engine and for them to be directly driven including the radiator fan by the conventional pulley at the first end of the engine. The mounting also presents the side of the engine including the injectors to be accessible at the rear panel 13A so that the engine can to some extent be worked upon while remaining in position within the engine compartment.

The motor 26 is also mounted partly on the cradle 30 and extends from the cradle forwardly of the vehicle to the drive shaft 27 and the differential 17. The cradle 30 only partially supports the radiator 28 and the motor 26. Thus in general terms, when installed in the vehicle, the cradle carries the rear end of the motor 26 at a support bracket 26A and the cradle carries a rear end 28C of the radiator 28. Thus the forward end of the radiator 28 is attached by a bracket 28D to the post 12B. Similarly the forward end of the motor 26 includes a horizontal cross bar 26B the ends of which sit on brackets 33 of the main longitudinal beams 34 and 35 of the vehicle. Thus again only the rear part of the motor 26 is carried on the cradle while the forward part is arranged for attachment to the vehicle itself.

Figure 3:
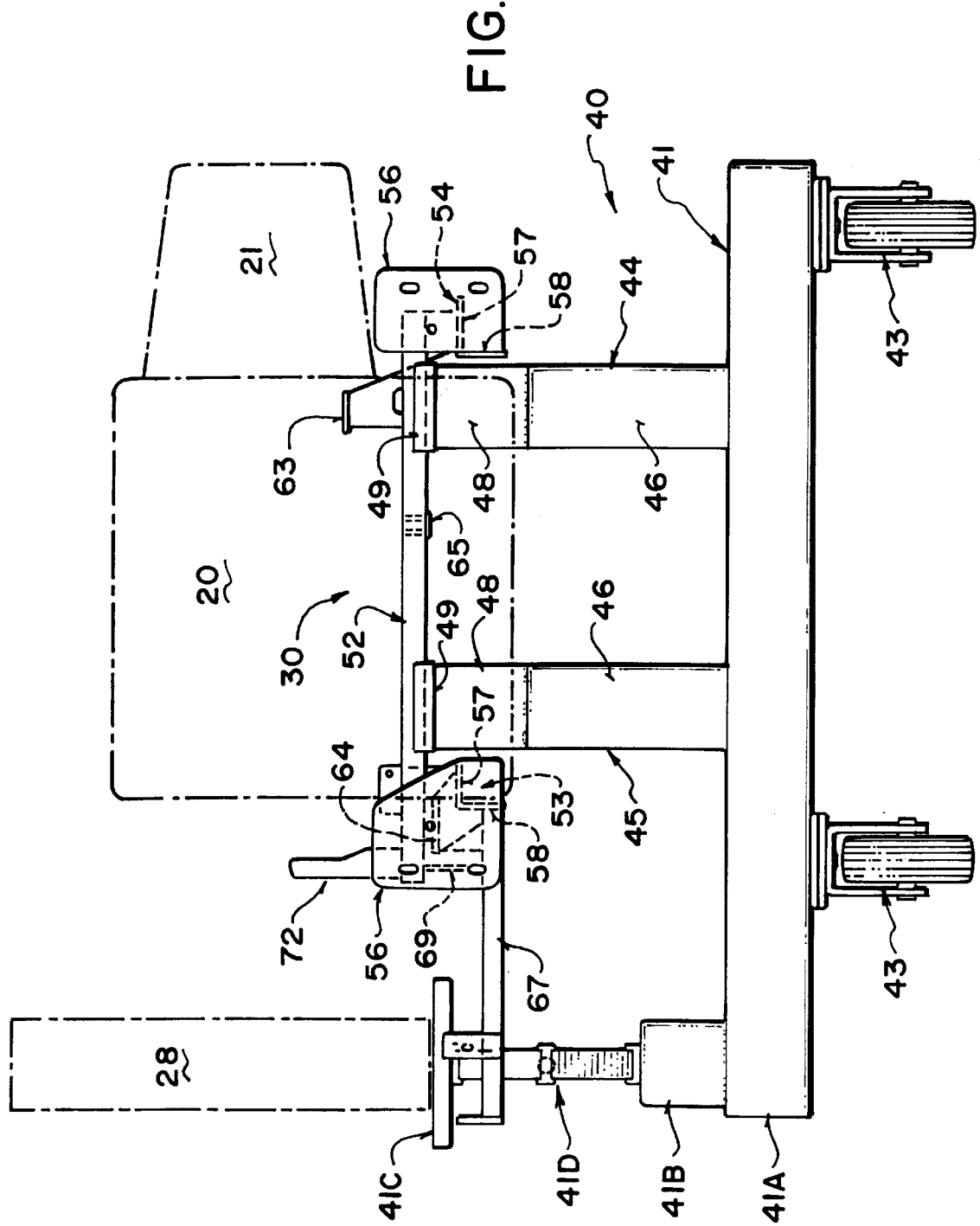
FIG. 3 is a rear elevational view partly in phantom showing the engine components and cradle arrangement of FIG. 1 separate from the bus of FIG. 1 and carried on a dolly for servicing.
Figure 4:
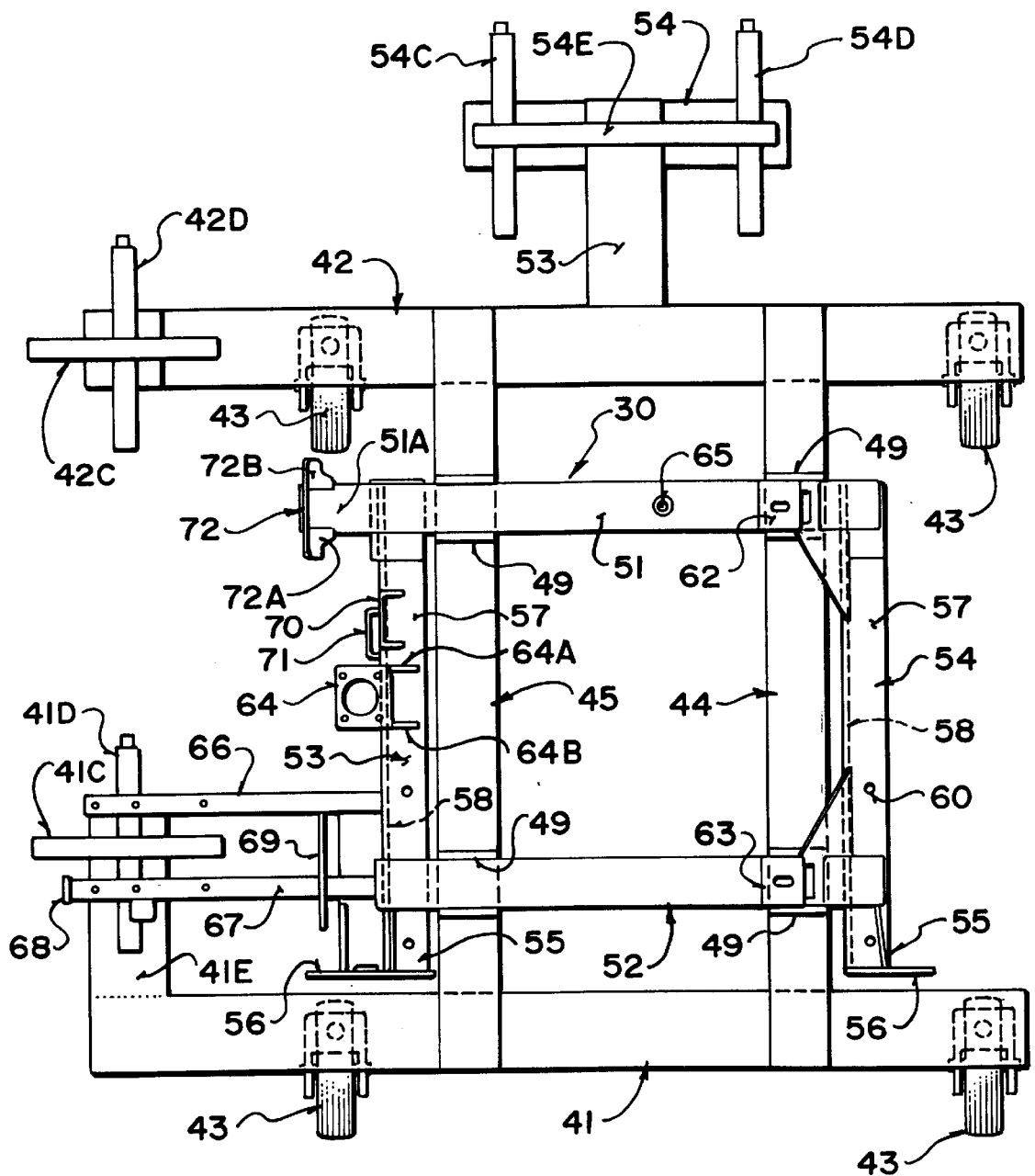
FIG. 4 is a top plan view showing the cradle arrangement of FIG. 1 mounted on the dolly of FIG. 3 with the engine components omitted for convenience of illustration.
Figure 5:
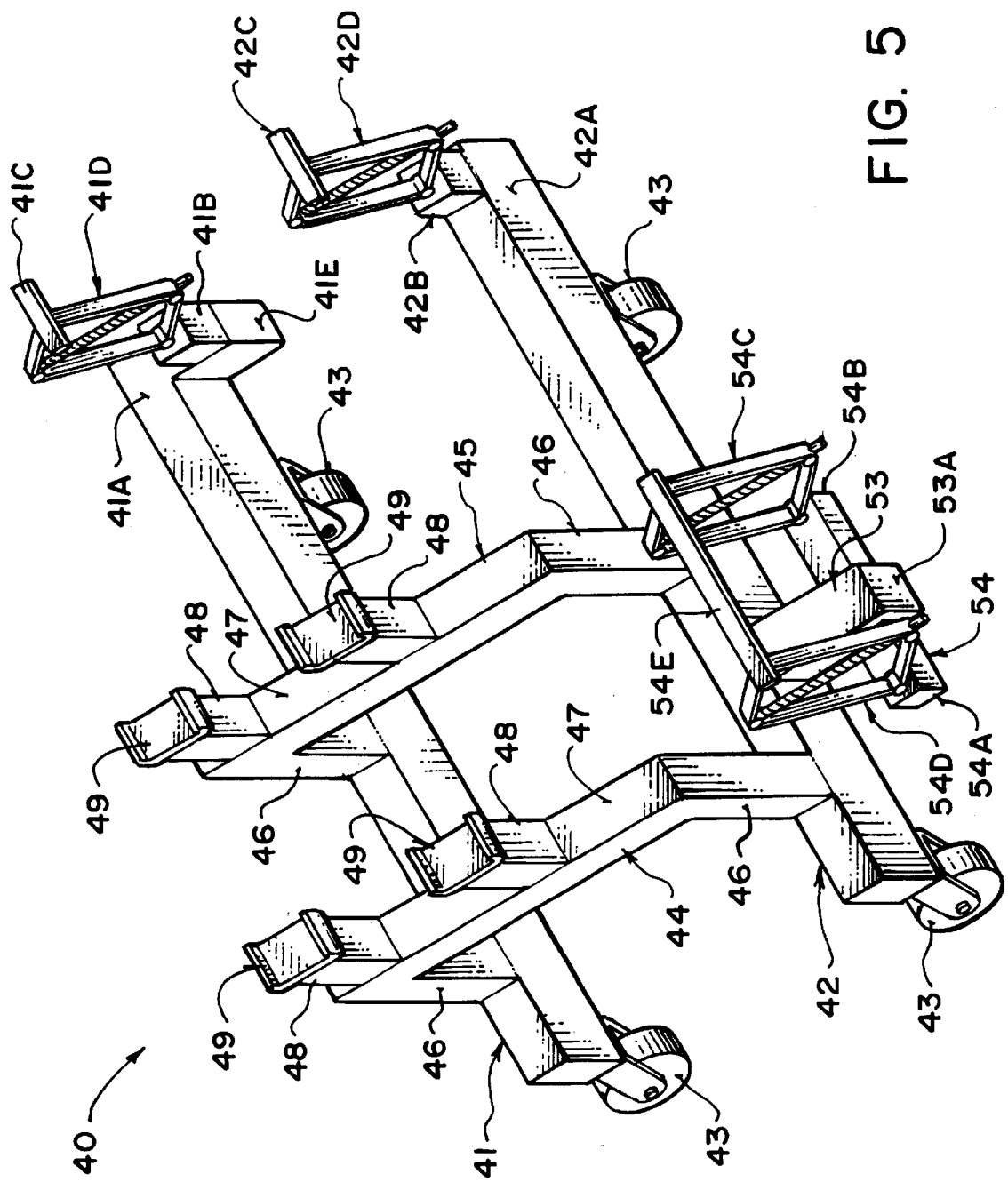
FIG. 5 is an isometric view of the dolly of FIG. 3 separate from the engine components.

In order that all of the engine components can be removed from the vehicle and supported for servicing separate from the vehicle, there is provided a dolly 40 shown in isometric view in FIG. 5, in plan view in FIG. 4 and in rear elevation in FIG. 3. The dolly 40 thus provides in general support brackets for the cradle 30 and also support elements which carry those parts of the engine components which are only partly supported by the cradle and particularly the radiator and the motor.

The dolly 40 comprises two main beams 41 and 42 each of which is mounted on a pair of castor wheels 43 so that the dolly can be moved from place to place simply by manually pushing the dolly. The beams 41 and 42 are interconnected by a pair of bridge members 44 and 45 each of which includes a pair of posts 46 and a horizontal cross beam 47. The cross beams 47 define supports for a pair of upstanding posts 48 each of which has a U-shaped receptacle 49 at its upper end. The U-shaped receptacles are aligned in two pairs each for carrying a respective rail 51, 52 of the cradle.

The beams 41 and 42 extend outwardly beyond the bridge member 45 to an outer end 41A, 42A. At each of the outer ends is provided an additional post 41B and 42B which stand upwardly and each receives and carries a horizontal support bar 41C and 42C which stands upwardly above the respective beam and parallel to the respective beam so as to provide a support surface for the radiator 28. Each of the support bars 41C and 42C is carried on a respective screw jack 41D, 42D which can be actuated in conventional manner to raise and lower the height of the respective support bar so as to provide a levelling action relative to the dolly. In order to locate the bar 41C at a required location relative to the radiator, the post 41B is mounted on a stub member 41E which projects inwardly from the outer end 41 A of the beam 41 toward the beam 42.

On the beam 42 is mounted a stub beam portion 53 which projects outwardly from the side of the beam 42 opposite to the bridge members and in between the bridge members to an end 53A. Across the end 53A is mounted an additional transverse beam 54 with ends 54A and 54B each carrying a respective screw jack 54C, 54D at the top of which is attached a transverse support bar 54E arranged above and parallel to the beam 54. Again therefore the height of the support bar 54E can be adjusted for a levelling action relative to the height of the dolly.

In operation, therefore, the dolly acts to support the cradle 30 by engagement with the rails 51 and 52 of the cradle. Thus the weight of the engine 20 and the generator 21 which is carried wholly on the cradle 30 is supported on the dolly and is movable with the dolly when the cradle is separated from the vehicle frame. The radiator is partly attached to the cradle so that its rear end 28C is carried on the cradle but its forward end is carried on the frame of the vehicle. Thus when the engine components are supported on the cradle, the radiator has the rear end thereof attached to the support elements of the cradle described herein after and the body of the radiator supported upon the bars 41C and 42C.

Similarly when the engine components are supported on the cradle and the dolly, the support bar 54E is located at a position underneath the forward end of the motor 26 and provides support therefore.

The height of the dolly is arranged to be significantly greater than the height of the engine components and the cradle when installed in the vehicle. The height of the dolly is arranged so that the engine components are located at a convenient height for service by the service operator without the need for excessive bending and while allowing access underneath the dolly and between the bridge members for reaching those elements of the engine components which are accessible from below. Thus in order to remove the engine components from the vehicle or to install the engine components in the vehicle, the vehicle frame is raised to a height sufficient that the dolly can be wheeled in to a position under the open rear of the vehicle with the hinged panel raised.

The cradle 30 includes the two rails 51 and 52 which are parallel and transverse the length of the vehicle. These rails are interconnected by longitudinal rails 53 and 54 which are located at respective ends of the rails 51 and 52. The rails 53 and 54 thus extend from one end at the rail 51 rearwardly to a rearward portion 55 located beyond the rail 52. The rearward portion 55 of each of the rails 53 and 54 carries an end plate 56 which stands in a vertical plane at right angles to the rail and mounts to a front face of the rear bumper 13B as shown in FIG. 2. Thus the bumper is attached to the cradle rather than to the longitudinal beams 34 and 35 constituting the main frame of the vehicle. The bumper can be attached to the cradle when the cradle is separate from the vehicle frame so that the bumper forms part of the components carried by the dolly.

The rails 53 and 54 are generally L-shaped so as to form a horizontal flange 57 and a vertical flange 58 at one side of the horizontal flange. The vertical flange is as shown in FIG. 3 on the lefthand side of the horizontal flange for both of the rails when viewed in rear elevation. The horizontal flange when the cradle is installed in the vehicle sits on top of the upper surface of the rectangular beam 34, 35 with the vertical flange 58 along the lefthand side of the respective beam 34, 35. In this way the cradle on the dolly can be rolled into the area of the engine compartment with the dolly to the left of its final position so that the vertical flanges 58 slide along the respective beam on the lefthand side of the beam until the required position is reached whereupon the dolly can be moved to the right to a fixed position and the horizontal flanges bolted into place through bolt holes 60 into the respective beam 34, 35.

The cradle defined by the transverse rails 51, 52 and the longitudinal rails 53, 54 provides suitable supports for the engine and its accessories. These supports can vary in accordance with the arrangement of the engine and its various components as will be apparent to one skilled in the art so that different engine designs will have different arrangements of the mounting points.

In the embodiment shown, however, the engine is mounted on three raised points defined in part by posts 62 and 63 which are located on the rails 51 and 52 respectively at the ends adjacent the longitudinal rail 54. The engine is further mounted on a raised pad 64 which is attached to the longitudinal rail 53 and projects to one side of that rail toward the side wall 12A of the vehicle mid-point between the transverse rails 51 and 52. Thus the engine is mounted on three points on suitable rubber mountings as will be well know to one skilled in the art.

Figure 6:
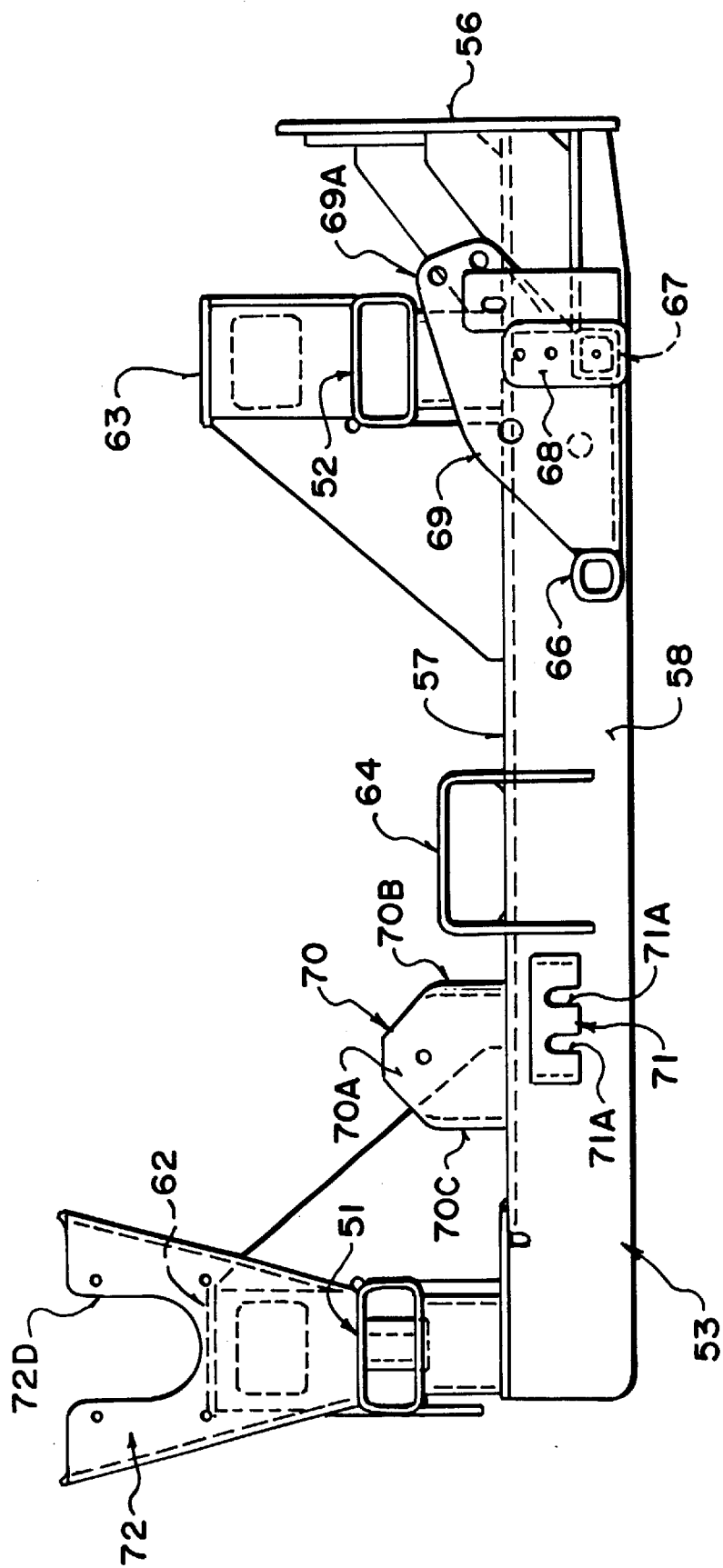
FIGS. 6 and 7 are respective side elevational views of the cradle of FIG. 1 alone separate from the engine components and the bus and the dolly.
Figure 7:
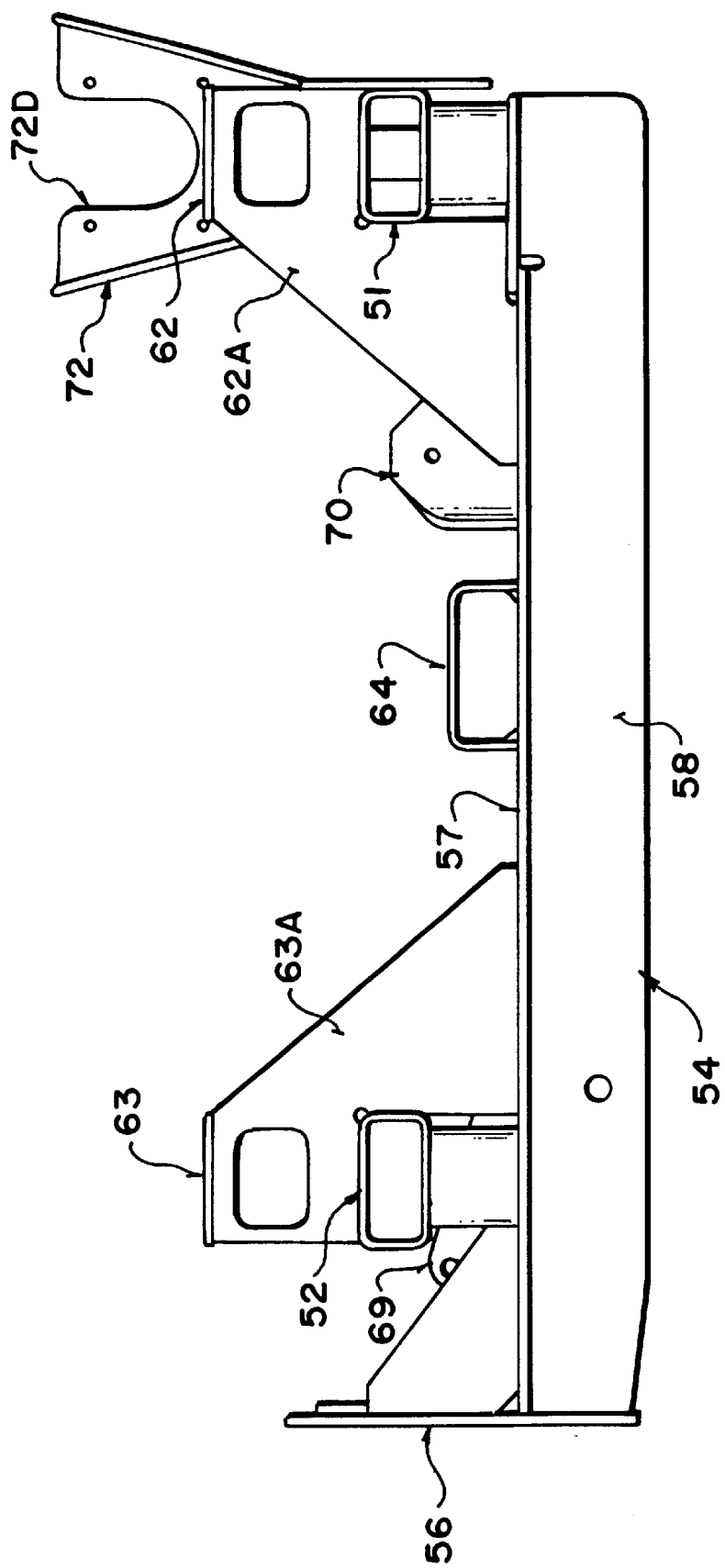

As best shown in FIGS. 6 and 7, the posts 62 and 63 are raised up from the top of the tubular rails 51 and 52 and are braced by webs 63A and 62A extending from the posts downwardly to the rail 54 which is at a height below the transverse rails 51 and 52. The support 64 sits on the top flange 57 of the rail 53 and is braced outwardly therefrom by side supports 64A and 64B.

The cradle further includes a mounting sleeve 65 which is located in a bore through the rail 51 and defines a rear mounting point for a single mounting pin at the rear of the motor 26. As explained previously the forward end of the motor 26 is carried on the cross beam 26B which does not form part of the cradle but is attached to the frame of the vehicle.

The cradle further includes two tubular arms 66 and 67 each of which extends outwardly from the rail 53 in the direction away from the rail 54. The arm 67 includes an end plate 68 which is bolted to the post 12D as shown in FIG. 2. The arms 66 and 67 attach to and partially provide support for the end 28C of the radiator assembly 28 and are bolted thereto by two pairs of holes at the end of the arms in a manner which will be apparent to one skilled in the art.

The cradle further includes a mounting plate 69 which has one end at the arm 66 and extends across between the arms 66 and 67 so as to bridge over the arm 67 to a raised upper end 69A at which is provided bolt holes for attachment to one of the engine accessories which in this case is the air conditioning compressor. Thus when installed, the ends of the arms are attached to the radiator and to the frame and the intermediate parts of the arms carry the AC compressor to form the components into a substantially rigid structure within the engine compartment.

A second accessory mounting plate 70 is mounted on the rail 53 and forms a front plate 70A and two rearwardly turned side supports 70B and 70C. A further accessory mounting plate 71 is mounted on the flange 58 of the rail 53 and provides a front face of the mounting plate parallel to and standing forwardly from the flange 58 with two recesses 71A to which the respective accessory can be mounted. The plates 70 and 71 in this case are used to support the tensioning arrangement for the drive belt to the radiator fan clutch.

A further accessory mounting plate 72 stands upwardly from a projecting end 51A of the rail 51 and is braced by two sides 72A and 72B. The plate 72 as a U-shaped central recess 72D for receiving the accessory concerned and in this case particularly the fan drive clutch of the radiator assembly 28.

It will be appreciated that the specific location of the mounting plates can of course be varied depending upon the specific location of the various accessories of the engine and the mounting locations on those accessories. Such accessories do of course vary from one manufacturer to another and the design of the cradle can be readily modified to accommodate the products of different manufacturers.

The engine alternator is attached in this arrangement directly to the engine and does not need specific mounting elements on the cradle.

When the cradle with the engine accessories thereon carried by the dolly so that those parts of the accessories not supported by the cradle are carried by the dolly is moved into position in the engine compartment, the cradle is bolted to the frame, the unsupported parts of the accessories are bolted to the relevant portions of the frame and structure of the vehicle allowing the dolly to be removed.

When the dolly is removed, the vehicle can be lowered from its raised position to the ground. At this time, if not already attached, the bumper can be attached on the plates 56. In most cases braces are provided extending between the rear end of the cradle, at suitable holes on the plates 56, and the roof structure of the vehicle so as to link the bottom frame with the roof frame to increase stability and rigidity of the vehicle. The hinged panel 13A is enclosed onto the structure.

In operation the engine is operated at optimum operating conditions to generate electricity in the generator 21. This alternating current from the generator 21 is communicated through suitable cables (not shown) to a rectifier 23A forming a part of the electrical control system 23 on the roof of the vehicle. This electrical power can be stored in the battery packs 24 and 25 also on the roof of the vehicle. Electrical power for driving the motor 26 is supplied through a control system 23B also on the roof forming part of the electrical system 23.

The battery packs 24 and 25 are located on opposite sides of the vehicle so that there are four compartments on the roof of the vehicle each covered by a cover panel 11A, which can be pivoted to allow access to the components underneath the panel. The roof includes suitable structural members (not shown) at the four respective locations each for mounting elements on the roof so as to be properly supported by the roof.

The battery packs can weigh as much as 1500 lbs and therefore they are arranged on respective sides of the vehicle and one forwardly with the other rearwardly as indicated in FIG. 1. The 2 other compartments are used for the relatively lightweight electrical components and one of the compartments may indeed be empty if the electrical components are insufficient to fill the first compartment alongside the battery pack 24.

In this way the loading on the roof is properly balanced both side to side and fore and aft of the vehicle. The electrical components are protected within the cover panel 11A and are kept away from the environment in the engine compartment and at the same time are accessible for service.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A combination comprising:
   a vehicle having:
   a vehicle body including structural members therein;
   a plurality of ground wheels mounted on the vehicle body for carrying the vehicle body in movement across the ground;
   an engine system including a plurality of separate engine components arranged to co-operate for driving at least two of the ground wheels for propulsion of the vehicle;
   a sub-frame;
   the sub-frame being arranged for readily releasable attachment to the vehicle body so as to be carried on the vehicle body during operation of the vehicle;
   the sub-frame being removable from the vehicle;
   the sub-frame being arranged such that, during operation of the vehicle, each of at least some of the engine components has a first part thereof supported on the sub-frame and a second part thereof supported on the vehicle body;
   and a movable service dolly for supporting during servicing the subframe and the engine components, the dolly including:
   first support elements for supporting the sub-frame with said first parts thereon when removed from the vehicle body;
   and second support elements for supporting said second parts when removed from the vehicle body such that the dolly and the sub-frame co-operate to support all of the engine components during servicing.

2. The combination according to claim 1 wherein the second support elements on the dolly for supporting said second parts include adjustable jacks for adjusting the height of said second parts relative the dolly.

3. The combination according to claim 1 wherein the dolly includes ground wheels by which the dolly can be rolled and wherein the vehicle body is arranged such that the dolly and the sub-frame with the engine components thereon can be rolled into one end of the body.

4. The combination according to claim 1 wherein the dolly is arranged such that the engine components when supported on the dolly are at a height greater than when supported on the vehicle body.

5. The combination according to claim 1 wherein the sub-frame is arranged for mounting on the vehicle body at one end of the vehicle body and wherein the sub-frame includes bumper plates at an outer end for carrying a bumper of the vehicle.

6. The combination according to claim 1 wherein:
   the plurality of wheels include two front wheels and two rear wheels with the two rear wheels being supported on a rear axle;
   the engine system drives the two rear wheels for propulsion of the vehicle;
   the engine system includes an internal combustion engine, a radiator having a fan driven by the internal combustion engine for cooling the internal combustion engine, an electrical generator driven by the internal combustion engine, a battery storage system for storing electrical energy from the generator and an electrical motor for receiving the electrical energy from the generator and from the battery storage system for driving the rear wheels;
   the radiator is mounted on the vehicle body along one side of the vehicle at the rear of the one side of the vehicle;
   the internal combustion engine is mounted on the sub-frame at the rear of the vehicle transversely of the vehicle with one side of the engine facing the rear, with a first end of the engine facing said of the vehicle so as to be positioned adjacent the fan of the radiator for driving the fan and with a second opposed end of the engine facing an opposed side of the vehicle;
   the generator is mounted at the second opposed end of the engine; and
   the motor is mounted on the sub-frame and the vehicle body in front of the engine with an output drive thereof facing and coupled to an input of the rear axle.

7. The combination according to claim 6 wherein the generator is directly coupled to an output drive shaft of the engine at the second opposed end of the engine.

8. The combination according to claim 1 wherein:

the plurality of wheels include two front wheels and two rear wheels with the two rear wheels being supported on a rear axle;

the engine system drives the two rear wheels for propulsion of the vehicle;

the engine system includes an internal combustion engine, a radiator having a fan driven by the internal combustion engine for cooling the internal combustion engine, an electrical generator driven by the internal combustion engine, a battery storage system for storing electrical energy from the generator and an electrical motor for receiving the electrical energy from the generator and from the battery storage system for driving the rear wheels;

the battery storage system includes a first storage pack and a second storage pack;

the engine system further includes an electrical control system; and the electrical control system being mounted on a roof of the vehicle with the first storage pack and the electrical control system being arranged side by side each on a respective side of a center line of the vehicle and the second storage pack being arranged longitudinally offset from the first storage pack on a side of the center line opposite the first storage pack.

9. A combination comprising:

a vehicle having:

a vehicle body including structural members therein;

a plurality of ground wheels mounted on the vehicle body for carrying the vehicle body in movement across the ground;

an engine system including a plurality of separate engine components arranged to co-operate for driving at least two of the ground wheels for propulsion of the vehicle;

a sub-frame;

the sub-frame being arranged for readily releasable attachment to the vehicle body so as to be carried on the vehicle body during operation of the vehicle;

the sub-frame having attached thereto for support thereby at least part of at least some of the engine components;

the sub-frame being removable from the vehicle;

the sub-frame being arranged such that, during operation of the vehicle, each of said at least some of the engine components has a first part supported on the sub-frame and a second part supported on the vehicle body;

and a movable service dolly for supporting during servicing the subframe and the engine components, the dolly including:

first support elements for supporting the sub-frame with said first parts thereon when removed from the vehicle body;

and second support elements for supporting said second parts when removed from the vehicle body;

such that the dolly and the sub-frame co-operate to support all of the engine components during servicing;

wherein said engine components include at least an engine, a radiator for cooling the engine, a drive communication component and connections therebetween;

and wherein the dolly and the sub-frame are arranged to co-operate to support the components during servicing such that the engine components are sufficiently complete to operate while supported on the sub-frame and dolly.

10. The combination according to claim 9 wherein the radiator is mounted on one side of the sub-frame for location in an opening at one side of the vehicle body and wherein the radiator is attached to the vehicle body at the opening.

11. The combination according to claim 9 wherein the sub-frame is arranged for insertion into the vehicle body from one end and wherein the drive communication component is mounted on a remote end of the sub-frame for insertion into the vehicle body beyond the engine and wherein a remote end of the drive communication component is mounted on the vehicle body.

12. The combination according to claim 11 wherein the vehicle body includes two parallel longitudinal beams on which the sub-frame is carried and wherein each beam includes an inwardly projecting tab member onto which a mounting of the remote end of the drive communication component is located.

13. The combination according to claim 9 wherein the engine components and the sub-frame are located at a rear end of the vehicle and the drive communication component is arranged to drive a differential of a rear axle of the vehicle.

14. The combination according to claim 9 wherein the dolly is arranged such that the engine components when supported on the dolly are at a height greater than when supported on the vehicle body.

15. The combination according to claim 9 wherein the sub-frame is arranged for mounting on the vehicle body at one end of the vehicle body and wherein the sub-frame includes bumper plates at an outer end for carrying a bumper of the vehicle.

* * * * *